Jan. 8, 1935.　　　　G. TABOZZI　　　　1,987,499

UNION FOR FLEXIBLE PIPES

Filed Oct. 25, 1933

Inventor:

Patented Jan. 8, 1935

1,987,499

UNITED STATES PATENT OFFICE 1,987,499

UNION FOR FLEXIBLE PIPES

Giacinto Tabozzi, Milan, Italy

Application October 25, 1933, Serial No. 695,217

2 Claims. (Cl. 285—75)

The present invention refers to improvements in unions, already known, for flexible pipes, especially for those which are constructed of different layers suitable for a pipe for fuel or oil, provided on the inside with a helix of metallic wire, these unions comprising a hollow core of any material, unattackable by the liquid which normally passes through the pipe, which has an exterior shape slightly conical and presenting along its outer surface a helicoidal groove of a width substantially equal to the diameter of the helix of metallic wire which forms the framework of the flexible pipe and having a pitch exactly equal to the helicoidal framework of the pipe, this pipe being able to engage by its helicoidal groove the revolutions of the framework of the pipe, slackening it progressively in the radial direction during its penetration into the pipe the said core presenting a permanently fixed edge or solid with the core and conveniently cut in order to be seized by a press.

The invention further refers to improvements in the combination of a union of this kind and connecting element between the core mounted in the flexible pipe and the device to which the pipe is to be assembled.

The first improvement consists precisely therein that on the outer surface of the slightly conical core there is formed a second helicoidal groove which is parallel to the first and has a width such as, to border at the upper part on the two sides, by means of a pointed thread, upon the first groove.

In the larger groove, the interior wall of the pipe comprised between the helix of metallic wire, seized by the narrower groove adapts itself to pressure in assisting (in the dry) watertightness in the union without having recourse to mastics or other means of improvement of the natural adhesion between the pipe and the conical surface of the union. Further it has been found that the adhesive between the two surfaces is such as absolutely to exclude an involuntary slipping of the pipe over the conical surface of the union.

A second improvement consists in that the hollow core is assembled on the body to which the pipe is to be joined by means of a mushroom head which is already solid, during use, and in a single piece with it, by means of a nut having an unthreadable smooth bore, with an interior diameter for perfect adaption on a cylindrical surface placed between the mushroom and the hollow body, The stopping of the nut on the said cylindrical surface such as to prevent its axial sliding but not its rotation with respect to the core, is ensured by the insertion of a wire or metallic cord in an annular channel formed by two superposed annular grooves, constructed respectively in the said smooth cylindrical bore of the nut and in the cylindrical part comprised between the core and the mushroom, the said metallic wire or the like being able to be inserted in the channel formed in the two grooves through an oblique hole formed on the periphery of the nut and directed tangently with respect to the annular channel.

In the annexed drawing one form of carrying out this invention is illustrated.

Referring to the said figures.

1 is the hollow core with an external surface slightly conical on which are provided two parallel grooves 2, 3, separated by the helicoidal threads 4, 5, parallel to them, bordering thereupon by a sharp edge. In the groove of smaller radius 2 are engaged the helices of the helicoidal framework of the pipe whilst in the grooves 5 of larger diameter the elastic wall of the pipe under a certain pressure, is supported, with an adherence, without the formation of interstices and consequently with a watertightness which prevents also, not only the slipping of the pipe, but also the unscrewing of the conical surface.

Figure 1:
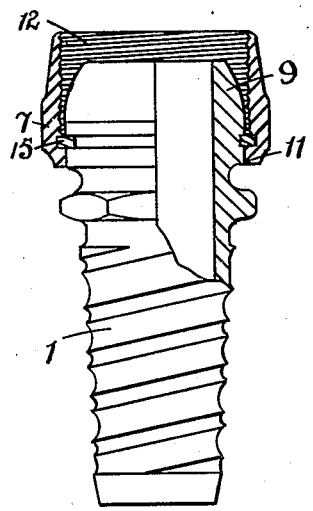
Fig. 1 shows partly in elevation and partly in longitudinal section the complete union comprising therein the mushroom coupling device and nut.
Figure 2:
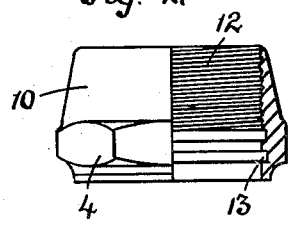
Fig. 2 shows the nut alone.
Figure 3:
Fig. 3 shows in section the coupling device inserted between the piece comprising the mushroom and the nut.
Figure 5:
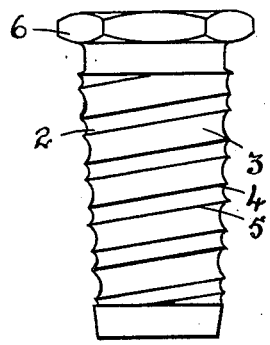
Fig. 5 shows an external view of the hollow conical body provided with two helicoidal grooves parallel one to the other.
Figure 4:
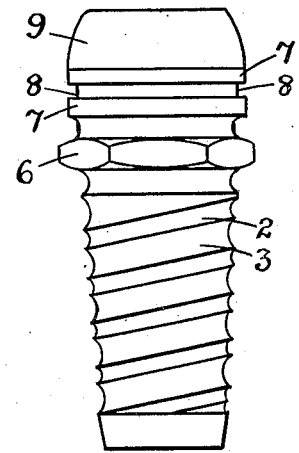
Fig. 4 shows an exterior view of the single body formed by the hollow core and by the mushroom.

The head 6 provided with planes for tightening with the aid of a key, is formed on the conical core 1. The piece 1, 6 is extended in a cylindrical body 7, interrupted by a groove 8; beyond this cylindrical part 7 there is a mushroom 9. A nut 10 has its cylindrical bore partly smooth at 11, and partly threaded at 12. The smooth cylindrical part 11 is interrupted by an annular groove 13. A perforation 14, tangential to the internal groove of the nut 10, terminates obliquely at the exterior of the nut at 14. Through this hole 14 when the cylindrical surface 11 of the nut 10 is threaded on the cylindrical surface of the body 1, 6, 9, so that the groove 8 is adjacent that of equal breadth 13 formed in the body 13, there is introduced the piece of metallic wire 15 (Figs. 1-3) which engages, without difficulty in the annular channel formed by the two grooves 8, 13, also uniting the nut 10 to the body 1, 7, 9, completely avoiding the work of soldering for assembling the mushroom to the conical core or other expedients utilized up to the present, which complicate the joint and render the locking problematical.

I claim.

1. Improvements in unions for flexible pipes especially for those which are composed of different layers, intended to deliver fuel or lubricant provided inside with a helix of metallic wire which union comprises a hollow core made of any material unattackable by the liquid passing through the pipe, having an external shape slightly conical and presenting along its outer surface a helicoidal groove of a width substantially equal to the diameter of the helix of metallic wire forming the helicoidal framework of the pipe, characterized in that on the exterior surface of the core of a shape slightly conical, there is constructed a second helicoidal groove parallel to the first, with a depth substantially equal to the first and breadth such as to border completely on the first groove by means of helicoidal parallel threads having preferably a substantially triangular cross section.

2. Improvements in flexible pipes according to claim 1, characterized in that the hollow core is assembled with the body to which the pipe is to be joined by means of a mushroom which is solid with it, already obtained during the manufacture of a single piece with it, and by means of a nut with a cylindrical bore partly threaded and partly smooth, of an interior diameter such as to be able to slide watertightly on a cylindrical surface of equal diameter situated between the mushroom and the hollow body, the stoppage of the nut on the said cylindrical surface against axial sliding, but not its rotation being ensured by the insertion of a wire or metallic cord or the like into an annular channel formed by two annular grooves formed respectively in the said interior cylindrical surface of the nut and in the exterior cylindrical surface comprised between the hollow core and the mushroom, the said wire or metallic cord or the like being capable of being inserted into the said channel through an oblique hole formed on the periphery of the nut and placed tangentially with respect to the said interior channel formed in the annular grooves, after having conveniently placed these in juxtaposition.

GIACINTO TABOZZI.